US009672558B2

(12) United States Patent
Egen (10) Patent No.: US 9,672,558 B2
(45) Date of Patent: Jun. 6, 2017

(54) TABLE-FORM PRESENTATION OF HIERARCHICAL DATA (71) Applicant: Gerd Egen, Wachenheim (DE)

(72) Inventor: Gerd Egen, Wachenheim (DE)

(73) Assignee: SAP SE, Walldorf (DE)

( * ) Notice: Subject to any disclaimer, the term of this patent is extended or adjusted under 35 U.S.C. 154(b) by 298 days.

(21) Appl. No.: 14/139,615

(22) Filed: Dec. 23, 2013

(65) Prior Publication Data

US 2015/0066841 A1    Mar. 5, 2015

(51) Int. Cl.
*G06F 7/00* (2006.01)
*G06F 17/30* (2006.01)
*G06Q 30/06* (2012.01)

(52) U.S. Cl.
CPC ... *G06Q 30/0631* (2013.01); *G06F 17/30589* (2013.01)

(58) Field of Classification Search
CPC ......... G06F 17/30327; G06F 17/30424; G06F 17/2247; G06F 17/227; G06F 17/30; G06F 17/30864; G06F 17/211; G06F 17/30589; G06F 17/30961; G06F 17/30292; Y10S 707/99942; Y10S 707/99943; G06Q 10/06; G06Q 10/103; G06Q 10/0633
See application file for complete search history.

(56) References Cited

U.S. PATENT DOCUMENTS 6,480,857 B1 * 11/2002 Chandler .......... G06F 17/30595
707/792
6,502,101 B1   12/2002 Verprauskus et al.
6,738,787 B2    5/2004 Stead
6,763,347 B1 *  7/2004 Zhang ............... G06F 17/30306
707/688
7,058,639 B1 *  6/2006 Chatterjee .......... G06F 17/3033
7,305,396 B2 * 12/2007 Schmidt ............. G01C 21/3638
7,383,516 B2    6/2008 Sauls, Jr. et al.
7,823,087 B2   10/2010 Nan et al.
8,209,353 B2 *  6/2012 Krishnamurthy ... G06F 17/2247
707/797
8,290,966 B2   10/2012 Vignet
(Continued)

FOREIGN PATENT DOCUMENTS

EP         1452974 A2      9/2004
EP         2098966 A1 *    9/2009  ......... G06F 3/04817
WO   WO 2008094810 A1 *    8/2008  ....... G06F 17/30607

OTHER PUBLICATIONS

A Common Database Approach for OLTP and OLAP Using an In-Memory col. Database, Plattner H., Proceedings of the 2009 ACM SIGMOD International Conference on Management of data, Jun. 29,-Jul. 2, 2009.*

(Continued)

*Primary Examiner* — Augustine K Obisesan
(74) *Attorney, Agent, or Firm* — Schwegman Lundberg & Woessner, P.A.

(57) ABSTRACT

Various embodiments herein each include at least one of systems, methods, and software for table-form presentation of hierarchical data. Some such embodiments include aggregating a hierarchical dataset as it may be stored in several rows of each of one to many tables or other similar data storage structures, grouping data according to the hierarchy, and writing the data in hierarchical groups to a table structure.

20 Claims, 4 Drawing Sheets

(56) References Cited

U.S. PATENT DOCUMENTS

| | | |
|---|---|---|
| 8,296,682 B2 | 10/2012 | Sloo |
| 8,341,168 B1 | 12/2012 | Velthoen |
| 8,370,185 B2 | 2/2013 | Fotteler et al. |
| 8,402,361 B2 | 3/2013 | Goldberg |
| 2002/0010700 A1* | 1/2002 | Wotring ............ G06F 17/30014 |
| 2002/0191033 A1 | 12/2002 | Roberts |
| 2003/0023609 A1* | 1/2003 | Della-Libera ..... G06F 17/30893 |
| 2003/0046300 A1* | 3/2003 | Arai ................. G06F 17/30994 |
| 2003/0097364 A1 | 5/2003 | Bata |
| 2003/0200224 A1* | 10/2003 | Zhang ............... G06F 17/30961 |
| 2003/0218640 A1 | 11/2003 | Noble-Thomas |
| 2004/0205536 A1 | 10/2004 | Newman et al. |
| 2004/0255244 A1* | 12/2004 | Filner ................... G06F 17/211 |
| | | 715/253 |
| 2005/0060300 A1* | 3/2005 | Stolte ................ G06F 17/30554 |
| 2005/0192941 A1* | 9/2005 | Biedenstein ...... G06F 17/30489 |
| 2006/0036613 A1* | 2/2006 | Attili ................. G06F 17/30554 |
| 2006/0095858 A1* | 5/2006 | Hao .................. G06F 17/30572 |
| | | 715/764 |
| 2006/0161545 A1* | 7/2006 | Pura ................. G06F 17/30707 |
| 2007/0005612 A1* | 1/2007 | Goh ................. G06F 17/30327 |
| 2007/0043693 A1* | 2/2007 | Krieg ................ G06F 17/30917 |
| 2008/0114717 A1* | 5/2008 | Jones ................ G06F 17/30457 |
| 2008/0120593 A1 | 5/2008 | Keren et al. |
| 2008/0183735 A1* | 7/2008 | Bruckner .......... G06F 17/30607 |
| 2009/0049372 A1* | 2/2009 | Goldberg .............. G06F 17/245 |
| | | 715/227 |
| 2009/0063517 A1 | 3/2009 | Wright et al. |
| 2009/0064045 A1* | 3/2009 | Tremblay .............. G06F 3/0482 |
| | | 715/835 |
| 2009/0319543 A1 | 12/2009 | Danton et al. |
| 2011/0295836 A1* | 12/2011 | Bolsius .................. G06Q 10/10 |
| | | 707/714 |
| 2012/0310958 A1* | 12/2012 | Rawlins .............. G06F 17/3056 |
| | | 707/756 |

OTHER PUBLICATIONS

"European Application Serial No. 14197658.9, Office Action mailed May 11, 2015", 8 pgs.

Conklin, Nathan, et al., "Multiple Foci Drill-Down through Tuple and Attribute Aggregation Polyarchies in Tabular Data", Department of Computer Science, Virginia Polytechnic Institute and State University, Blacksburg, VA 24061, (2002), 4 pgs.

* cited by examiner

TABLE-FORM PRESENTATION OF HIERARCHICAL DATA

BACKGROUND INFORMATION

User Interfaces today are of limited abilities in presenting deep hierarchically structured data. In particular, user interfaces when presenting hierarchically structured data beyond just a very few data items of a particular data row or other data object are limited to presenting just a very few data items at the same time. Additionally, most tree views used today only allow having the same columns for all tree nodes.

DETAILED DESCRIPTION

Various embodiments illustrated and described herein each include at least one of systems, methods, and software for table-form presentation of hierarchical data. Some such embodiments include aggregating a hierarchical dataset, as it may be stored in several rows of each of one to many tables or other similar data storage structures, grouping data according to the hierarchy, and writing the data in hierarchical groups to a table structure. The data of the table structure is typically written in a descending manner from a highest level to a lowest level. For example, a highest data row may be written followed by a next lower level data row of the hierarchy, and then each of the lowest level data rows at that point of in the hierarchy where such lowest level data rows are dependent upon the immediately previous data row written to the table structure. This may continue until all rows are written to the table structure or at least until a viewable portion of a user interface is fully utilized in presenting data. In such embodiments, upon a user interface resizing event or a scrolling event, further table structure rows may be populated.

Various embodiments may be implemented as server-side software such as may be called as a function or service of a larger data processing system, such as an enterprise resource planning (ERP) system, customer relationship management system (CRM), human resources management system (HRM) system, data visualization system, and the like. Other embodiments may be implemented in whole or in part in client software, such as may be included with a thin or thick client application or app. Additionally, other embodiments may be provided as a web service, remote function, or other element that may be sent a hierarchical dataset via a network and will generate a table-form presentation of the hierarchical dataset. These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
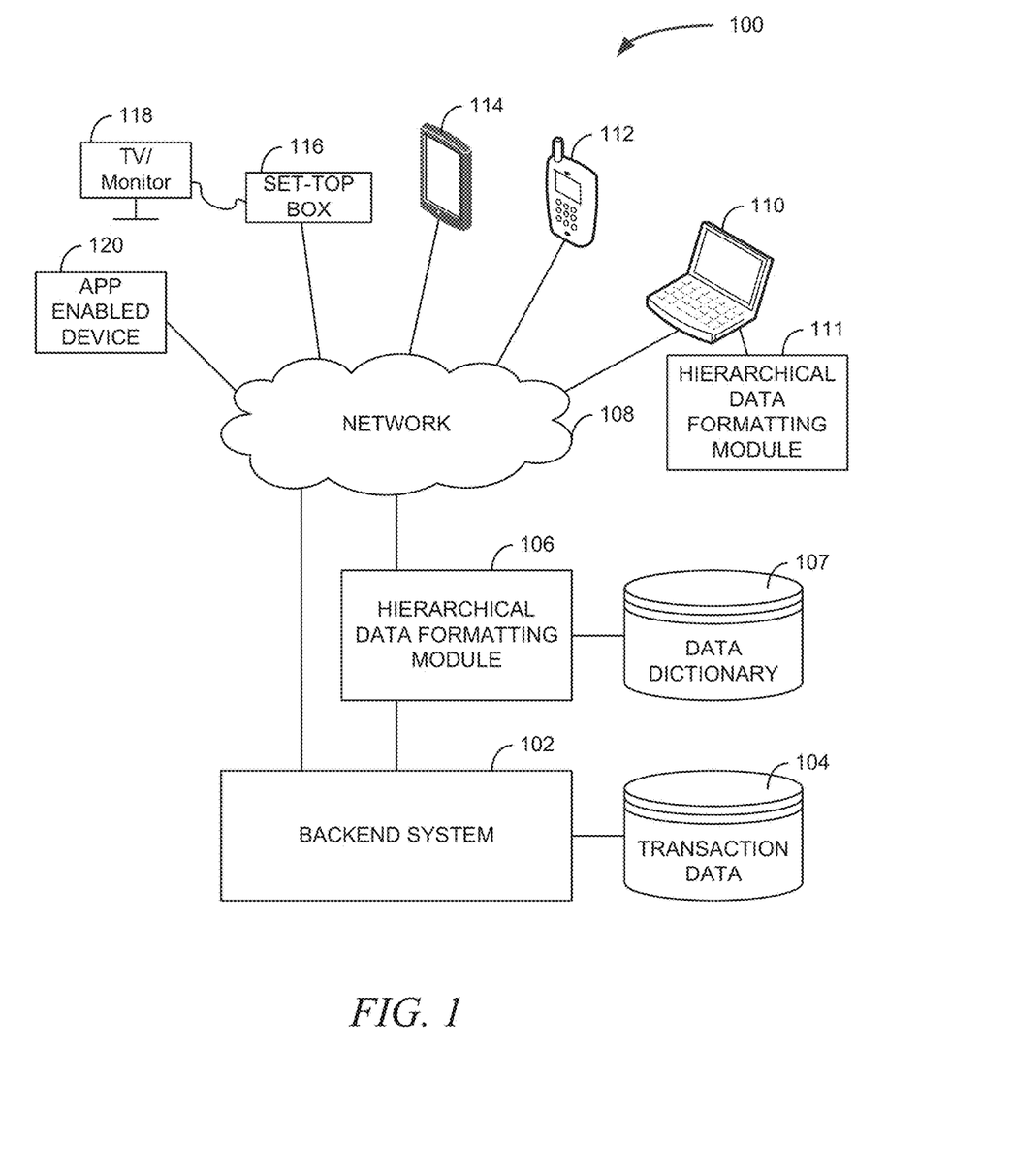
FIG. 1 is a logical block diagram of a system, according to an example embodiment.

FIG. 1 is a logical block diagram of a system 100, according to an example embodiment. The system 100 is an example computing environment within which various embodiments may be implemented.

The system 100 includes a backend system 102 of an enterprise, such as one or more of an enterprise resource planning (ERP), customer relationship management (CRM), human resources management (HRM), a transaction processing system, a customer retail system such as may provide multiple data views of various products offered by an enterprise, an order and order processing system, a banking system, and the like.

The backend system 102 stores and processes transaction data 104 as may be stored in a database, data files, and other data storage processes and devices. Some of this data as stored by the backend system 102 may be hierarchical in nature and spread across numerous tables. For example, there may be a manufacturer table providing data of many different manufactures. There may be a product table where data of products is stored and each product includes an association to a manufacturer table row. Additionally, each product may also be associated with zero to many distributor or retailer rows. Thus, data stored by the backend system 102 may be hierarchical in nature.

The backend system 102 may be deployed to one or more computing devices, such as one or more enterprise-class server computers, virtual machines, and the like. The backend system 102 may be accessed by other systems and programs that execute and various computing devices throughout the system 100. For example, the backend system 102 may be accessed via a network 108 by thick-client or thin-client applications as may be deployed to personal computers 110, by other software systems, and other clients. The backend system 102 may also be accessed by a hierarchical data formatting module 106 either directly or via the network 108. The hierarchical data formatting module 106 of such embodiments is a module that may be a part of the backend system 102 or be an add-on module thereto.

The hierarchical data formatting module 106 operates in the networked environment of the system 100 between the backend system 102 and devices 112, 114, 116, 120 of users and apps deployed thereto. However, in some embodiments, the hierarchical data formatting module 106 may also operate with web browser apps as may be deployed to web browser applications of personal computers 110 and other computing devices or directly or indirectly with web browser applications as may be deployed to one or more of the computer 110 and devices 112, 114, 116, 120.

The hierarchical data formatting module 106 in some such embodiments communicates with processes of the backend system 102 or a database, such as a database of transaction data, to obtain hierarchical data sets upon request from apps that execute on mobile devices 112, 114, 116, 120, web browser apps that execute within web browsers, or directly from web browsers.

The hierarchical data formatting module 106 may be deployed as an add-on module to the backend system 102 and operate on the same or different hardware thereof, in some embodiments. However, in other embodiments, the hierarchical data formatting module 106 may be deployed as a standalone program that executes on one or more distinct computing devices or virtual machines from the backend system 102. In some embodiments, the hierarchical data formatting module 106 is hosted by a third party, such as in a cloud-computing type arrangement.

The network 108 is generally a network capable of transporting data between computing devices of the various functional data processing elements of the system 100, such as the backend system 102, the hierarchical data formatting module 106, personal computers 110 and the various mobile devices 112, 114, 116, 120. The network 108 may include both wired and wireless connections. The network 108 is intended to represent one or more of virtually any type of network capable of transporting data as described, such as one or more of a local area network, a wide area network, a system area network, a value added network, a virtual private network, the Internet, and other such networks.

Figure 2:
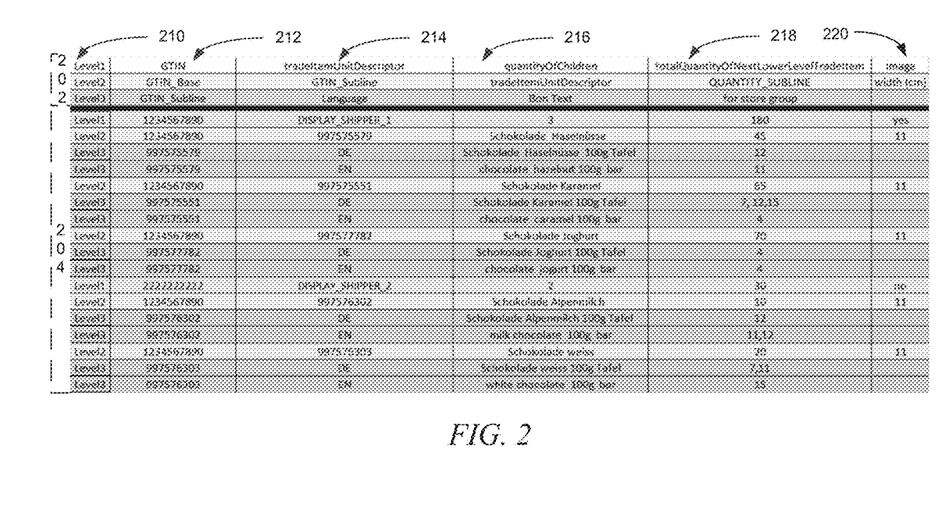
FIG. 2 illustrates a table-form presentation of hierarchical data, according to an example embodiment.

FIG. 2 illustrates a table-form presentation of hierarchical data, according to an example embodiment. The illustrated table is an example of how hierarchical data may be presented in a table-form, according to some embodiments.

As illustrated, the table includes a key area 202 and a data area 204. The table includes six columns 210, 212, 214, 216, 218, 220. The key area 202 identifies what the columns 210, 212, 214, 216, 218, 220 of each data row represent. The column 210 is a level indicator (i.e., Level1, Level2, Level3). The data rows in the data area 204 are of a level as indicated in this column 210. That column data values in the data area 204 are of the types identified in the column of the respective level type of the particular row. Thus, where column 210 equals "Level1" of data rows in the data area 204, the subsequent column values are representative of values of the columns 212, 214, 216, 218, 220 listed in the "Level1" row of the key area 202. Thus, large hierarchical datasets can be presented in such a table to illustrate the hierarchical relationships between data in a manner that accommodates varying data types between hierarchy levels.

Figure 3:
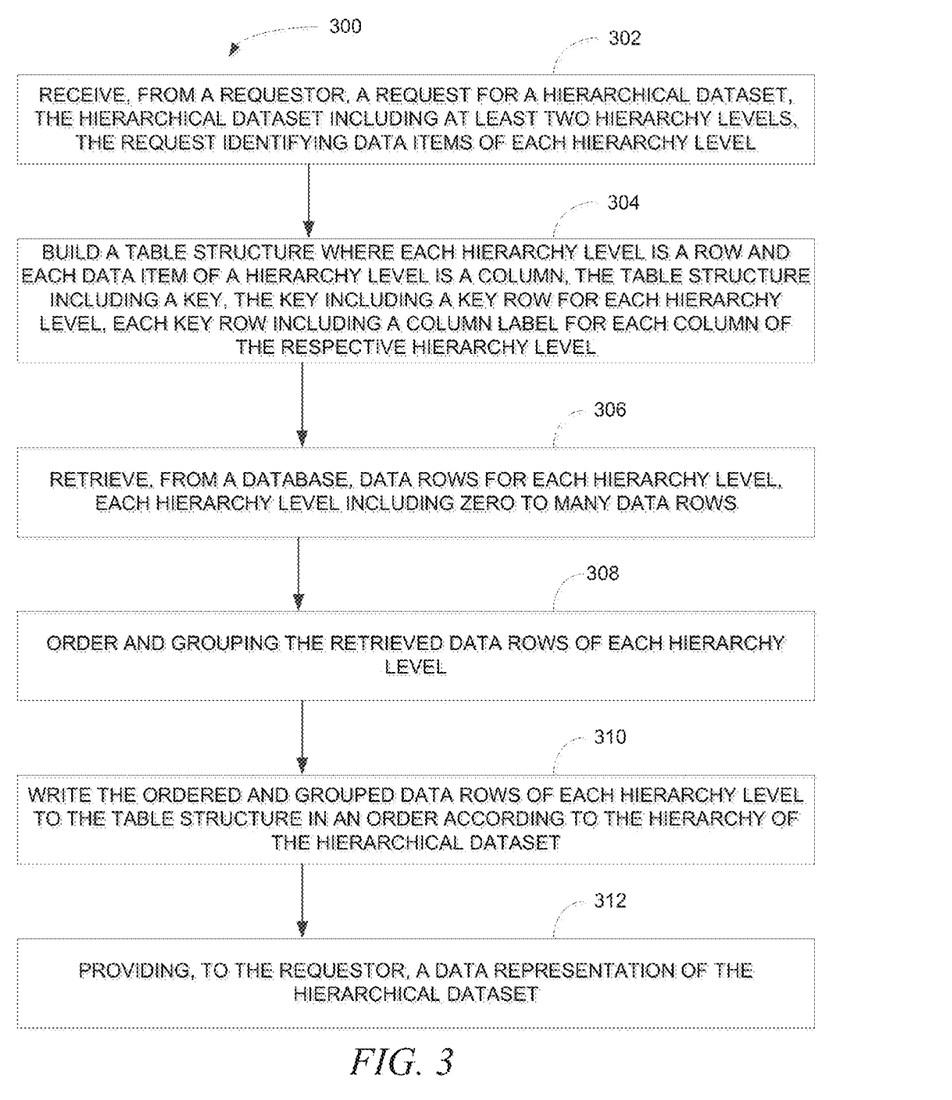
FIG. 3 is a block flow diagram of a method, according to an example embodiment.

FIG. 3 is a block flow diagram of a method 300, according to an example embodiment. The method 300 is an example of a method that may be performed by hierarchical data formatting module, such as may be deployed on a network, as an add-on module to a larger software system, as a web-service, as part of a client app or application, or in other forms.

In some embodiments, the method 300 includes receiving 302, from a requestor, such as a client app or application via a network, a request for a hierarchical dataset. The requested hierarchical dataset generally includes at least two hierarchy levels and the received 302 request identifies data items of each hierarchy level. The method 300 further includes building 304, in memory of a computing device such as a server or client computing device performing the method 300, a table structure where each hierarchy level is a row and each data item of a hierarchy level is a column. The table structure built 304 also typically includes a key having a key row for each hierarchy level and each key row including a column label for each column of the respective hierarchy level. An example of such a table structure is illustrated in FIG. 2 and the key is illustrated at reference number 202.

The example method 300 also includes retrieving 306, into memory from a database or other data store, data rows for each hierarchy level. Each hierarchy level may include zero to many rows. However, if hierarchy level includes no rows, there generally can be no lower level rows. The retrieved data rows are then ordered and grouped 308 according to hierarchy level and organization of the hierarchy represented in the data. Subsequently the ordered and grouped 308 data rows may be written 310 to the table structure in memory in an order according to the hierarchy of the hierarchical dataset. The hierarchical dataset may then be stored in some embodiments. However, in some such embodiments, and other embodiments where the hierarchical dataset is not stored, the method 300 includes providing 312, to the requestor, such as in the form of data transmitted via the network, a data representation of the hierarchical dataset from the memory. Providing 312 the hierarchical dataset may be provided simply by copying the table structure from the memory or providing a requesting program, app, or process a memory reference thereto that may be used to access the hierarchical dataset directly from the table structure in memory.

In some embodiments, each row of the table structure key includes a hierarchy level label and each row written to the table structure in the memory includes a hierarchy level label. Additionally, the table structure may include a number of columns equal to a number of data items of a hierarchy level of the at least two hierarchy levels including a largest number of data items identified in the received request plus one additional column to which hierarchy level label data is written. For example, a first level of the hierarchy may include four columns, a second level may include five columns, and a third level may include three columns. Columns and data items are generally synonyms in this instance. The largest number of data items (i.e., columns) amongst the three hierarchy levels is five. Thus, the table structure will include five columns and in some embodiments, the table structure may include an additional column, as in the embodiment illustrated in FIG. 2, in which hierarchy level indication data is provided for each respective row.

Further, with regard to the data items or columns of the rows of hierarchy data, the columns of one hierarchy level need not have the same data type of equivalent columns of the other hierarchy level rows. For example, a row of a first hierarchy level may include ordered columns having data types of text, text, number, dollars, and date. A row of a second hierarchy level may include respectively ordered columns having data types of text, number, text, date, image. Thus, the data types of columns between rows need not be aligned in all embodiments.

In some embodiments, the ordering and grouping 308 of data rows of each hierarchy level may include calculating a least one calculated column value as defined in the request for the hierarchical dataset. Similarly, in some embodiments, one or more of the column values identified in the request to include in the hierarchy is a value calculated by a stored procedure of a database management system or a value calculated by a callable object, function, web service, and the like.

In some embodiments of the method 300, the providing 312 of the data representation of the hierarchical dataset includes retrieving the table structure from memory and encoding the table structure according to a defined schema, such as a markup language schema. In some such embodiments, the markup language schema is a defined extensible markup language (XML) schema. Such embodiments of the method 300 may then send, to the requestor via the network, the encoded table structure.

In some embodiments of the method 300, the request is received 302 is received within a client application. In such embodiments, the providing 312 of the data representation includes presenting the hierarchical dataset within a user interface view generated by the client application. However, the database from which the data rows are retrieved 306 may be accessed the network or from local data storage, such as may be stored on a volatile or non-volatile data storage device.

In some such embodiments of the method 300, presenting the hierarchical dataset within a user interface view generated by the client application may include determining a width of a display area within which the data representation of the hierarchical dataset is to be presented. Subsequently, the client application may generate a view of the data representation in the form of a table. In some such embodiments, the table has a width no greater than the width of the display area. The method 300 in such embodiments may further include scaling a width of each column of the table such that a sum of column widths is equal to the table width and placing text representative of the data of values for each column in respective columns of respective rows of the table. Further, when the text representation of a column value of a row has a width greater than a width of the column, the text may be wrapped such that the entirety of the text is presented the then scaling a height of each row according to a greatest height of text to be presented in columns of the respective row.

Figure 4:
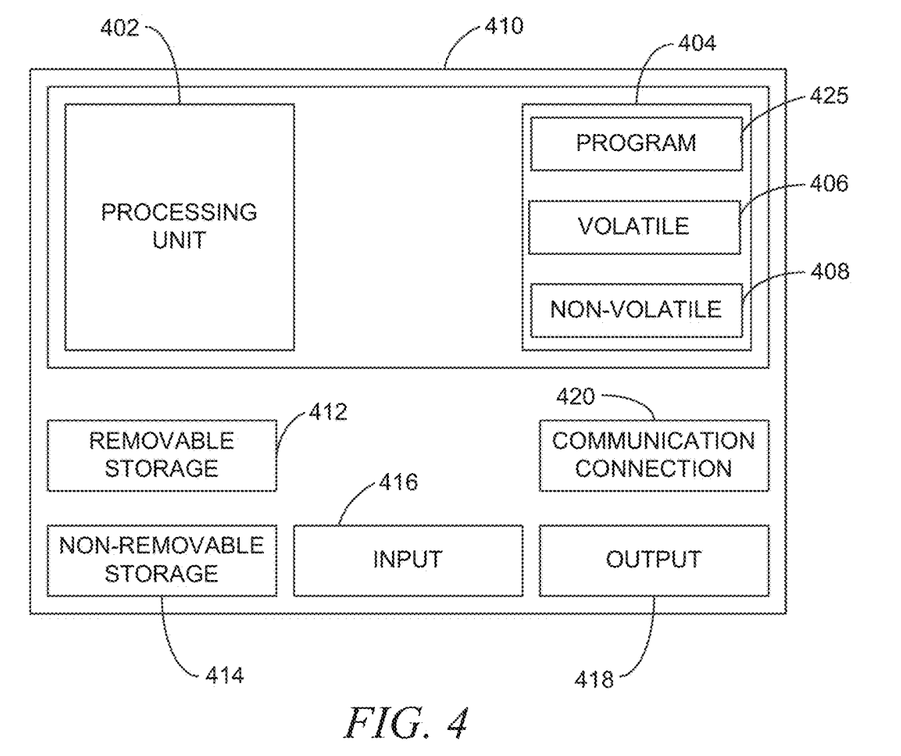
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a smartphone, a tablet, or other computing device including the same or similar elements as illustrated and described with regard to FIG. 4. Further, although the various data storage elements are illustrated as part of the computer 410, the storage may also or alternatively include cloud-based storage accessible via a network, such as the Internet.

Returning to the computer 410, memory 404 may include volatile memory 406 and non-volatile memory 408. Computer 410 may include—or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The input 416 may include one or more of a touchscreen, touchpad, mouse, keyboard, camera, and other input devices. The computer may operate in a networked environment using a communication connection 420 to connect to one or more remote computers, such as database servers, web servers, and other computing device. An example remote computer may include a personal computer (PC), server, router, network PC, a peer device or other common network node, or the like. The communication connection 420 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   receiving, from a requestor via a network, a request for a hierarchical dataset, the hierarchical dataset including at least two hierarchy levels, the request identifying data items of each hierarchy level;
   building, in memory, a single table structure where each hierarchy level is a row and each data item of a hierarchy level is a column, the single table structure including a key within the single table structure, the key including a first key row for a first hierarchy level of the at least two hierarchy levels and a second key row for a second hierarchy level of the at least two hierarchy levels, wherein the first key row comprises a first plurality of column labels for the first hierarchy level and the second key row comprises a second plurality of column labels for the second hierarchy level;

retrieving, into the memory from a database, a plurality of data rows, the plurality of data rows comprising a first data row of the first hierarchy level described by the first plurality of column labels and a second data row of the second hierarchy level described by the second plurality of column labels;

ordering and grouping the retrieved data rows of each hierarchy level;

writing the ordered and grouped data rows of each hierarchy level to the single table structure in the memory in an order according to the at least two hierarchy levels of the hierarchical dataset; and transmitting, to the requestor via the network, a data representation of the hierarchical dataset from the memory.

2. The method of claim 1, wherein the first key row of the key includes a first hierarchy level label and the first data row includes the first hierarchy level label.

3. The method of claim 2, wherein the single table structure includes a number of columns equal to a number of data items of the first hierarchy level including a largest number of data items identified in the received request plus one additional column to which hierarchy level label data is written.

4. The method of claim 1, wherein ordering and grouping data rows of each hierarchy level further includes calculating a least one calculated column value as defined in the request for the hierarchical dataset.

5. The method of claim 1, wherein transmitting the data representation of the hierarchical dataset includes:
retrieving the single table structure from the memory;
encoding the single table structure according to a defined schema; and
sending, to the requestor via the network, the encoded single table structure.

6. The method of claim 5, wherein the encoding of the single table structure is performed according to an extensible markup language schema.

7. The method of claim 1, wherein data of the first hierarchy level includes data types that are of unique data types with respect to data types of the second hierarchy level.

8. A non-transitory computer-readable medium, with instructions stored thereon, which when executed by at least one processor of a computing device, cause the computing device to:
receive, from a requestor, a request for a hierarchical dataset, the hierarchical dataset including at least two hierarchy levels, the request identifying data items of each hierarchy level;
build a single table structure where each hierarchy level is a row and each data item of a hierarchy level is a column, the single table structure including a key within the single table structure, the key including a first key row for a first hierarchy level of the at least two hierarchy levels and a second key row for a second hierarchy level of the at least two hierarchy levels, wherein the first key row comprises a first plurality of column labels for the first hierarchy level and the second key row comprises a second plurality of column labels for the second hierarchy level;
retrieve, from a database, a plurality of data rows, the plurality of data rows comprising a first data row of the first hierarchy level described by the first plurality of column labels and a second data row of the second hierarchy level described by the second plurality of column labels;
order and grouping the retrieved data rows of each hierarchy level;
write the ordered and grouped data rows of each hierarchy level to the single table structure in an order according to the at least two hierarchy levels of the hierarchical dataset; and
provide, to the requestor, a data representation of the hierarchical dataset.

9. The non-transitory computer-readable medium of claim 8, wherein the first key row of the key includes a first hierarchy level label and the first data row includes the first hierarchy level label.

10. The non-transitory computer-readable medium of claim 9, wherein the single table structure includes a number of columns equal to a number of data items of the first hierarchy level including a largest number of data items plus one additional column to which hierarchy level label data is written.

11. The non-transitory computer-readable medium of claim 8, wherein the request is received within a client application, the providing of the data representation includes presenting the hierarchical dataset within a user interface view generated by the client application, and the database from which the data rows are retrieved is accessed via a data network.

12. The non-transitory computer-readable medium of claim 11, wherein presenting the hierarchical dataset within a user interface view generated by the client application includes:
determining a width of a display area within which the data representation of the hierarchical dataset is to be presented; and
generating a view of the data representation in the form of a table, wherein:
the table has a width no greater than the width of the display area;
scaling a width of each column of the table such that a sum of column widths is equal to the table width;
placing text representative of the data of values for each column in respective columns of respective rows of the table;
when the text representation of a column value of a row has a width greater than a width of the column, wrapping the text such that the entirety of the text is presented; and
scaling a height of each row according to a greatest height of text to be presented in columns of the respective row.

13. The non-transitory computer-readable medium of claim 8, wherein the request is received by a service of a server-based software system via a network in the form of a function call.

14. The non-transitory computer-readable medium of claim 8, wherein providing the data representation of the hierarchical dataset includes:
encoding the single table structure according to a defined schema.

15. A system comprising:
at least one processor;
at least one memory;
at least one network interface device; and
an instruction set accessible in the memory and executable by the at least one processor to:
receive, from a requestor via the at least one network interface device, a request for a hierarchical dataset, the hierarchical dataset including at least two hierarchy levels, the request identifying data items of each hierarchy level;

build, in the at least one memory, a single table structure where each hierarchy level is a row and each data item of a hierarchy level is a column, the single table structure including a key within the single table structure the key including a first key row for a first hierarchy level of the at least two hierarchy levels and a second key row for a second hierarchy level of the at least two hierarchy levels, wherein the first key row comprises a first plurality of column labels for the first hierarchy level and the second key row comprises a second plurality of column labels for the second hierarchy level;

retrieve, into the at least one memory from a database, a plurality of data rows, the plurality of data rows comprising a first data row of the first hierarchy level described by the first plurality of column labels and a second data row of the second hierarchy level described by the second plurality of column labels;

order and grouping, in the at least one memory, the retrieved plurality of data rows;

write the ordered and grouped data rows of each hierarchy level to the single table structure in an order according to the at least two hierarchy levels of the hierarchical dataset; and retrieve, from the at least one memory, and transmitting, to the requestor via the at least one network interface device, a data representation of the hierarchical dataset.

16. The system of claim 15, wherein the first key row of the key includes a first hierarchy level label and the first data row includes the first hierarchy level label.

17. The system of claim 16, wherein the single table structure includes a number of columns equal to a number of data items of the first hierarchy level of the including a largest number of data items identified in the received request plus one additional column to which hierarchy level label data is written.

18. The system of claim 15, wherein transmitting the data representation of the hierarchical dataset includes:
retrieving the single table structure from the at least one memory;
encoding the single table structure according to a defined schema; and
sending, to the requestor via the at least one network interface device, the encoded single table structure.

19. The system of claim 15, wherein the encoding of the single table structure includes determining table and column widths and row heights by:
setting the table as having a width no greater than a width of a display area within which the table is to be presented;
scaling a width of each column of the table such that a sum of column widths is equal to the table width;
placing text representative of the data of values for each column in respective columns of respective rows of the table;
when the text representation of a column value of a row has a width greater than a scaled column width, wrapping the text such that the entirety of the text is viewable when presented; and
scaling a height of each row according to a greatest height of text to be presented in columns of the respective row.

20. The system of claim 19, wherein the encoding of the single table structure further includes generating a markup language representation of the single table structure including representations of the determined table and column widths and row heights.

* * * * *